(12) United States Patent
Ekseth et al.

(10) Patent No.: US 7,350,410 B2
(45) Date of Patent: Apr. 1, 2008

(54) SYSTEM AND METHOD FOR MEASUREMENTS OF DEPTH AND VELOCITY OF INSTRUMENTATION WITHIN A WELLBORE

(75) Inventors: Roger Ekseth, Sjetnemarka (NO); Martyn Ian Greensmith, Aberdeen (GB)

(73) Assignee: Gyrodata, Inc., Houston, TX (US)

( * ) Notice: Subject to any disclaimer, the term of this patent is extended or adjusted under 35 U.S.C. 154(b) by 0 days.

(21) Appl. No.: 11/134,660

(22) Filed: May 20, 2005

(65) Prior Publication Data

US 2005/0217365 A1 Oct. 6, 2005

Related U.S. Application Data

(63) Continuation of application No. 10/811,317, filed on Mar. 26, 2004, now Pat. No. 6,957,580.

(60) Provisional application No. 60/539,234, filed on Jan. 26, 2004.

(51) Int. Cl.
*E21B 45/00* (2006.01)
(52) U.S. Cl. ................................. 73/152.45
(58) Field of Classification Search ............. 73/152.46, 73/152.48–152.49, 152.54, 152.59, 488, 73/152.45; 166/250.01
See application file for complete search history.

(56) References Cited

U.S. PATENT DOCUMENTS 3,490,149 A * 1/1970 Bowers ................... 340/854.1

| 4,537,067 A | 8/1985 | Sharp et al. ............. 73/152.13 |
| 4,545,242 A | 10/1985 | Chan ....................... 73/152.01 |
| 4,909,336 A | 3/1990 | Brown et al. .................. 175/45 |

(Continued)

FOREIGN PATENT DOCUMENTS

EP 0 646 696 A1 5/1999

(Continued)

OTHER PUBLICATIONS

US 6,151,553, 11/2000, Estes et al. (withdrawn).

(Continued)

*Primary Examiner*—Hezron Williams
*Assistant Examiner*—Tamiko Bellamy
(74) *Attorney, Agent, or Firm*—Knobbe, Martens, Olson & Bear LLP

(57) ABSTRACT

A survey tool for use in a wellbore includes a downhole portion having an axis. The downhole portion is adapted to move within the wellbore with the axis generally parallel to the wellbore. The survey tool further includes a first acceleration sensor mounted at a first position within the downhole portion. The first acceleration sensor is adapted to generate a first signal indicative of an acceleration of the first acceleration sensor along the axis. The survey tool further includes a second acceleration sensor mounted at a second position within the downhole portion. The second position is spaced from the first position by a non-zero distance along the axis. The second acceleration sensor is adapted to generate a second signal indicative of an acceleration of the second acceleration sensor along the axis. The survey tool further includes a controller adapted to receive the first signal and the second signal and to calculate a depth, a velocity, or both a depth and a velocity of the downhole portion in response to the first signal and the second signal.

20 Claims, 5 Drawing Sheets

U.S. PATENT DOCUMENTS

| | | | |
|---|---|---|---|
| 4,987,684 A | 1/1991 | Andreas et al. | 33/304 |
| 5,522,260 A | 6/1996 | Chappellat et al. | 73/152.02 |
| 5,585,726 A | 12/1996 | Chau | 324/326 |
| 5,657,547 A | 8/1997 | Uttecht et al. | 33/304 |
| 5,806,195 A | 9/1998 | Uttecht et al. | 33/304 |
| 5,812,068 A | 9/1998 | Wisler et al. | 340/855.5 |
| 5,821,414 A | 10/1998 | Noy et al. | |
| 5,842,149 A | 11/1998 | Harrell et al. | 702/9 |
| 6,021,377 A | 2/2000 | Dubinsky et al. | 702/9 |
| 6,145,378 A | 11/2000 | McRobbie et al. | 73/490 |
| 6,173,773 B1 | 1/2001 | Almaguer et al. | 166/255.2 |
| 6,192,748 B1 | 2/2001 | Miller | 73/152.01 |
| 6,206,108 B1 | 3/2001 | MacDonald et al. | 175/24 |
| 6,315,062 B1 | 11/2001 | Alft et al. | 175/45 |
| 6,381,858 B1 | 5/2002 | Shirasaka | 33/304 |
| 6,453,239 B1 | 9/2002 | Shirasaka et al. | 701/220 |
| 6,484,818 B2 | 11/2002 | Alft et al. | 175/45 |
| 6,837,332 B1 * | 1/2005 | Rodney | 181/105 |
| 2002/0032529 A1 | 3/2002 | Duhon | 702/6 |
| 2002/0056201 A1 | 5/2002 | Dallas et al. | 33/313 |
| 2002/0112887 A1 | 8/2002 | Harrison | 175/27 |

FOREIGN PATENT DOCUMENTS

| | | |
|---|---|---|
| WO | WO 02/103158 A1 | 12/2002 |
| WO | PCT/US2004/021899 | 1/2005 |
| WO | PCT/US2005/002275 | 1/2005 |

OTHER PUBLICATIONS

"±150°s Single Chip Yaw Rate Gyro with Signal Conditioning," *Analog Devices*, ADXRS150, © 2003 Analog Devices, Inc.

"±300°s Single Chip Yaw Rate Gyro with Signal Conditioning," *Analog Devices*, ADXRS300.

Geen, J., et al., "New iMEMS® Angular-Rate-Sensing Gyroscope," *Analog Dialogue*, vol. 37, No. 3, 2003, pp. 1-4.

Teegarden, Darrell, et al., "How to Model and Simulate Microgyroscope Systems," *IEEE Spectrum*, vol. 35, No. 7, Jul. 1998, pp. 66-75.

Yazdi, N., et al., "Micromachined Inertial Sensors," *Proc. of the IEEE*, vol. 86, No. 8, Aug. 1998, pp. 1640-1659.

* cited by examiner

SYSTEM AND METHOD FOR MEASUREMENTS OF DEPTH AND VELOCITY OF INSTRUMENTATION WITHIN A WELLBORE

CLAIM OF PRIORITY

This application is a continuation of U.S. patent application Ser. No. 10/811,317, filed Mar. 26, 2004, now U.S. Pat. No. 6,957,580 which claims the benefit of U.S. Provisional Application No. 60/539,234, filed Jan. 26, 2004, both of which are incorporated in their entirety by reference herein.

BACKGROUND OF THE INVENTION

1. Field of the Invention

The present application relates generally to systems and method for determining the depth, the velocity, or both the depth and the velocity of an instrumentation package within a wellbore.

2. Description of the Related Art

Surface-based wellbore depth measurements are typically made periodically during wellbore drilling for the exploration of oil and gas deposits to determine the absolute depth of the drilling tool within the wellbore. In such measurements, the depth of the drilling tool is typically determined by surface measurements of the lengths of the pipe sections inserted into the wellbore between the drilling tool and the surface.

Using wireline surveys, the drilling of the wellbore is periodically halted and a survey tool is lowered into the wellbore. As the survey tool is guided along the wellbore, it can provide information regarding its orientation and location by sending signals through a wire or cable to the surface. The absolute depth of the survey tool down the wellbore is typically given by a surface-based measurement of the length of the wire or cable between the survey tool and the surface. Similarly, surface-based logging measurements of the absolute depth of detected geological formations are typically made by surface measurements of the length of the wire or cable between the logging tool and the surface. However, due to various distortions, the cumulative length of the pipe sections or of the wire while within the wellbore can differ from the cumulative length measured at the surface, resulting in errors in the determination of the absolute depth.

In addition, surface-based measurements of the velocity of the survey tool along the wellbore can be used to determine the relative distances between detected features or formations within the wellbore. For example, the time period between detecting two separate features along the wellbore and the velocity of the survey tool during this time period can be multiplied together to provide the relative distance between the two detected features. However, as with the surface-based depth measurements described above, surface-based velocity measurements do not provide a sufficient accuracy (e.g., within only a few centimeters) to tell when two geophysical sensors with significant along-hole separation pass the same geological formation within only a few centimeters of accuracy. For example, due to friction or other effects within the wellbore, the survey tool can move in a jerking manner with varying velocity. In addition, these effects can result in the velocity of the survey tool within the wellbore differing from the measured velocity of the wire or cable at the surface.

Inertial navigation systems have been proposed as being able to provide improved wellbore depth and velocity measurements. Such inertial navigation systems can determine the depth of the survey tool by double integration of the detected acceleration. However, such procedures are vulnerable to noise in the detected acceleration, which results in a drift of the depth measurement from the true depth of the survey tool. It has been difficult, and will likely continue to be difficult, to get such inertial navigation systems to work without providing aiding data such as surface-based depth measurements or updates of the depth obtained while the survey tool is stationary (i.e., zero-velocity updates) to remove this drift. However, it is generally desirable to avoid using surface-based aiding data, since such data would effectively transform an inertial navigation system into a surface-depth system, thereby including the problems of such systems. It is also generally desirable to avoid zero-velocity updates due to large increases in the time and costs associated with such surveys.

Improved wellbore depth and velocity measurements are desirable to understand the geological formations being drilled and the oil or gas deposits being accessed. For example, improved measurements can resolve uncertainties in the depth measurements of a geological fault from wellbore positioning surveys in two nearby wells. In addition, improved wellbore depth measurements are helpful for drilling safety by providing more reliable information regarding the true wellbore depth to avoid drilling into adjacent wells.

SUMMARY OF THE INVENTION

In certain embodiments, a survey tool is adapted for use in a wellbore. The survey tool comprises a downhole portion having an axis. The downhole portion is adapted to move within the wellbore with the axis generally parallel to the wellbore. The survey tool further comprises a first acceleration sensor mounted at a first position within the downhole portion. The first acceleration sensor is adapted to generate a first signal indicative of an acceleration of the first acceleration sensor along the axis. The survey tool further comprises a second acceleration sensor mounted at a second position within the downhole portion. The second position is spaced from the first position by a non-zero distance along the axis. The second acceleration sensor is adapted to generate a second signal indicative of an acceleration of the second acceleration sensor along the axis. The survey tool further comprises a controller adapted to receive the first signal and the second signal and to calculate a depth, a velocity, or both a depth and a velocity of the downhole portion in response to the first signal and the second signal.

In certain embodiments, a method determines a depth of a downhole portion of a survey tool along a wellbore. The method comprises providing a survey tool comprising a downhole portion. The downhole portion comprises a first acceleration sensor and a second acceleration sensor. The first acceleration sensor is adapted to generate a first signal indicative of an acceleration of the first acceleration sensor along the wellbore. The second acceleration sensor is adapted to generate a second signal indicative of an acceleration of the second acceleration sensor along the wellbore. The second acceleration sensor is spaced from the first acceleration sensor by a non-zero distance. The method further comprises receiving the first signal and the second signal while the downhole portion is at a first location within the wellbore. The method further comprises receiving the first signal and the second signal while the downhole portion is at a second location within the wellbore. The method further comprises calculating a depth of the downhole portion of the survey tool in response to the first signal and the second signal received while the downhole portion is at the first location and in response to the first signal and the second signal received while the downhole portion is at the second location.

In certain embodiments, a method determines a velocity of a downhole portion of a survey tool along a wellbore. The method comprises providing a survey tool comprising a downhole portion. The downhole portion comprises a first acceleration sensor and a second acceleration sensor. The first acceleration sensor is adapted to generate a first signal indicative of an acceleration of the first acceleration sensor along the wellbore. The second acceleration sensor is adapted to generate a second signal indicative of an acceleration of the second acceleration sensor along the wellbore. The second acceleration sensor is spaced from the first acceleration sensor by a non-zero distance. The method further comprises receiving the first signal and the second signal while the downhole portion is at a first location within the wellbore. The method further comprises receiving the first signal and the second signal while the downhole portion is at a second location within the wellbore. The method further comprises calculating a velocity of the downhole portion of the survey tool in response to the first signal and the second signal received while the downhole portion is at the first location and in response to the first signal and the second signal received while the downhole portion is at the second location.

For purposes of summarizing the invention, certain aspects, advantages and novel features of the invention have been described herein above. It is to be understood, however, that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF THE PREFERRED EMBODIMENT

Certain embodiments described herein provide a true downhole-based system for measuring a depth, a velocity, or both a depth and a velocity of a downhole portion with sufficient accuracy for logging and drilling applications.

Figure 1:
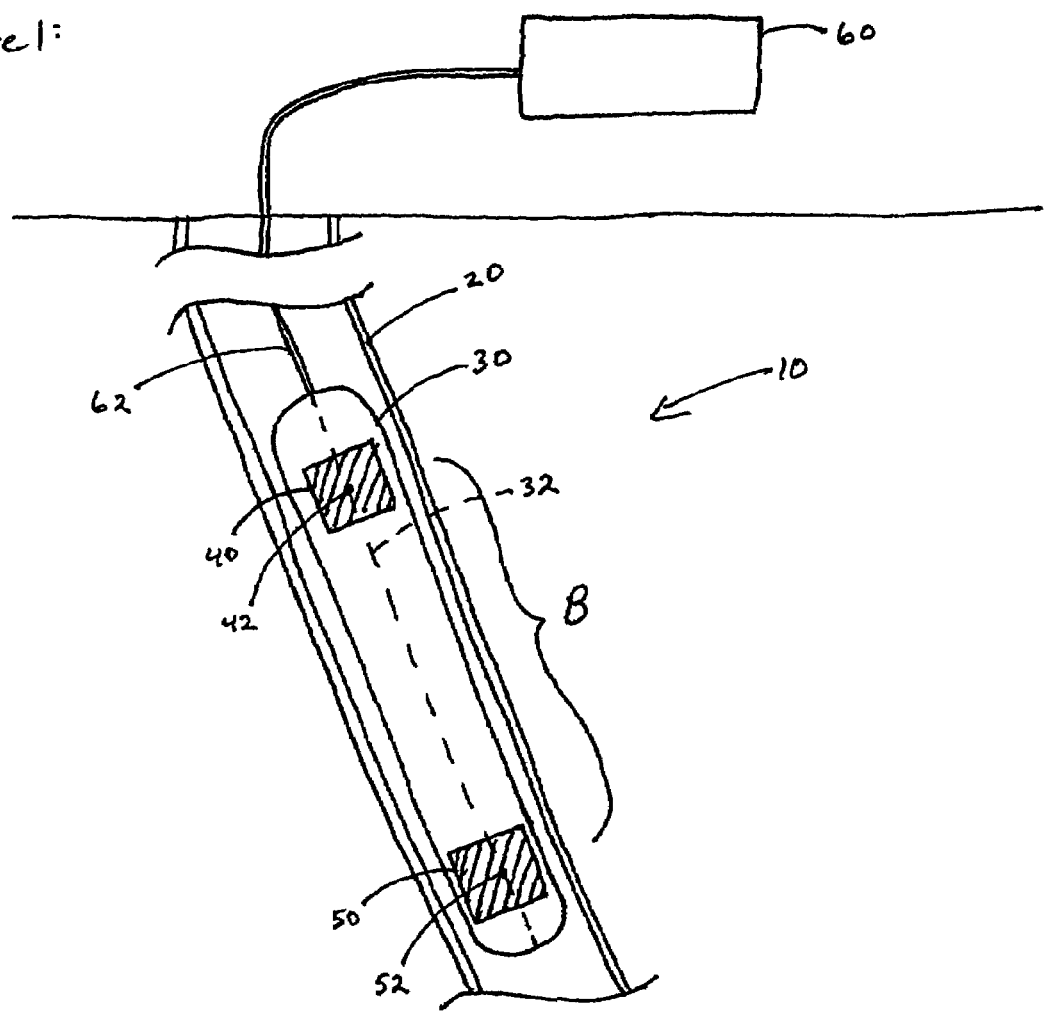
FIG. 1 schematically illustrates a survey tool compatible with embodiments described herein for use in a wellbore.

FIG. 1 schematically illustrates a survey tool 10 compatible with embodiments described herein for use in a wellbore 20. The survey tool 10 comprises a downhole portion 30 having an axis 32. The downhole portion 30 is adapted to move within the wellbore 20 with the axis 32 generally parallel to the wellbore 20. The survey tool 10 further comprises a first acceleration sensor 40 mounted at a first position 42 within the downhole portion 30. The first acceleration sensor 40 is adapted to generate a first signal indicative of an acceleration of the first acceleration sensor 40 along the axis 32. The survey tool 10 further comprises a second acceleration sensor 50 mounted at a second position 52 within the downhole portion 30. The second position 52 is spaced from the first position 42 by a non-zero distance B along the axis 32. The second acceleration sensor 50 is adapted to generate a second signal indicative of an acceleration of the second acceleration sensor 50 along the axis 32. The survey tool 10 further comprises a controller 60 adapted to receive the first signal and the second signal. The controller 60 is further adapted to calculate a depth, a velocity, or both a depth and a velocity of the downhole portion 30 in response to the first signal and the second signal. In the embodiment schematically illustrated by FIG. 1, the controller 60 is at the surface and is coupled to the downhole portion 30 by a cable 62.

In certain embodiments, the survey tool 10 is a component of a drill string and is used to determine the actual depth of a drilling tool (e.g., drill bit) of the drilling assembly. Drill strings compatible with embodiments described herein include, but are not limited to, measurement-while-drilling (MWD) strings. In certain other embodiments, the survey tool 10 is a component of a navigational string and is used to determine at least a portion of the wellbore path. In certain other embodiments, the survey tool 10 is a component of a logging string and is used to determine the actual depth of detected geological features along the wellbore 20 or relative depths between detected geological features along the wellbore 20. Logging strings compatible with embodiments described herein include, but are not limited to, logging-while-drilling (LWD) strings. In certain embodiments, the drill string or the logging string includes a sufficient number of sensors and adequate spacings between the first acceleration sensor 40 and the second acceleration sensor 50 to perform the method described below. In certain embodiments, the drill string or the logging string includes redundant acceleration sensors (e.g., cross-axial accelerometers).

In certain embodiments, the downhole portion 30 comprises a housing containing at least one of the acceleration sensors. As schematically illustrated by FIG. 1, the housing of certain embodiments contains both the first acceleration sensor 40 and the second acceleration sensor 50. In other embodiments, the first acceleration sensor 40 and the second acceleration sensor 50 are not contained in a single housing, but are positioned on different portions of the downhole portion 30.

Figure 2:
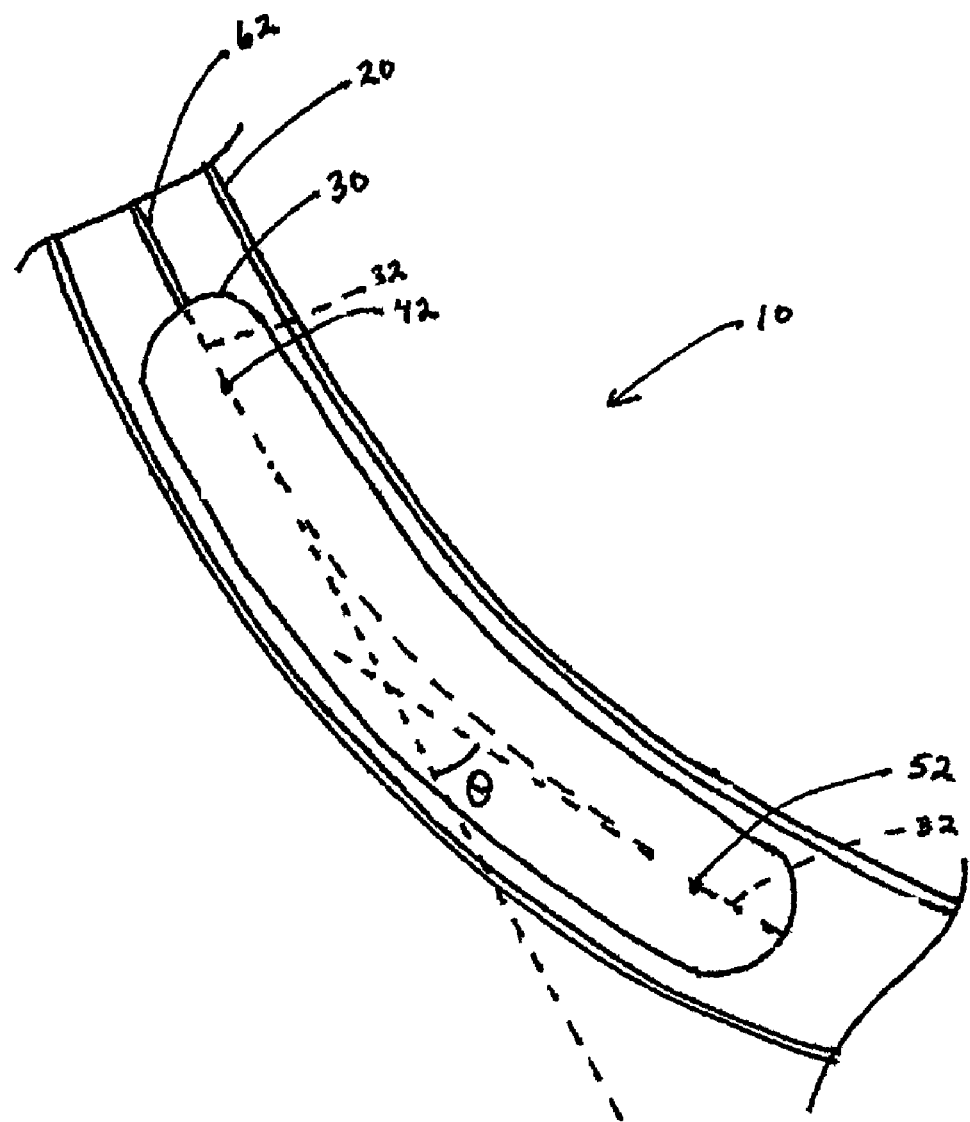
FIG. 2 schematically illustrates the survey tool in a portion of the wellbore having a curvature.

In certain embodiments, the downhole portion 30 is adapted to bend as the downhole portion 30 moves through a curved portion of the wellbore 20. FIG. 2 schematically illustrates a downhole portion 30 within a section of the wellbore 20 having a curvature such that the direction of the wellbore 20 changes by a non-zero angle θ. In such embodiments, the downhole portion 30 bends by the non-zero angle θ such that the axis 32 of the downhole portion 30 is substantially parallel to the wellbore 20. Under such conditions, the axis 32 at the first position 42 is at the non-zero angle with respect to the axis 32 at the second position 52.

In certain embodiments, the first acceleration sensor 40 and the second acceleration sensor 50 comprise accelerometers currently used in conventional wellbore survey tools. In certain embodiments, one or both of the first acceleration sensor 40 and the second acceleration sensor 50 comprise a single-axis accelerometer sensitive to accelerations along a single sensing direction. In such embodiments, the single-axis accelerometer is advantageously mounted so that its sensing direction is substantially parallel with the axis 32 of the downhole portion 30. In other embodiments, one or both of the first acceleration sensor 40 and the second acceleration sensor 50 comprise a two-axis (i.e., cross-axial) accelerometer sensitive to accelerations in an x-y plane. In such embodiments, the two-axis accelerometer is advantageously mounted so that its x-y plane is parallel to the axis 32 of the downhole portion 30. In certain embodiments, the first acceleration sensor 40 and the second acceleration sensor 50 are advantageously substantially identical. Exemplary accelerometers include, but are not limited to, quartz flexure suspension accelerometers available from a variety of vendors. Other types of acceleration sensors are also compatible with embodiments described herein.

In certain embodiments, the distance B between the first position 42 and the second position 52 along the axis 32 of the downhole portion 30 is advantageously selected to be long enough to respond to curvature of the wellbore 20 such that the downhole portion 30 bends substantially equally to the curvature of the wellbore 20. The distance B of certain embodiments is selected such that the first acceleration sensor 40 and the second acceleration sensor 50 detect different accelerations along the axis 32 when the downhole portion 30 is in a curved portion of the wellbore 20. In certain embodiments, the distance B is larger than approximately 10 meters, while in other embodiments, the distance B is in a range between approximately 10 meters and approximately 30 meters. Other distances B are compatible with embodiments described herein.

Figure 3:
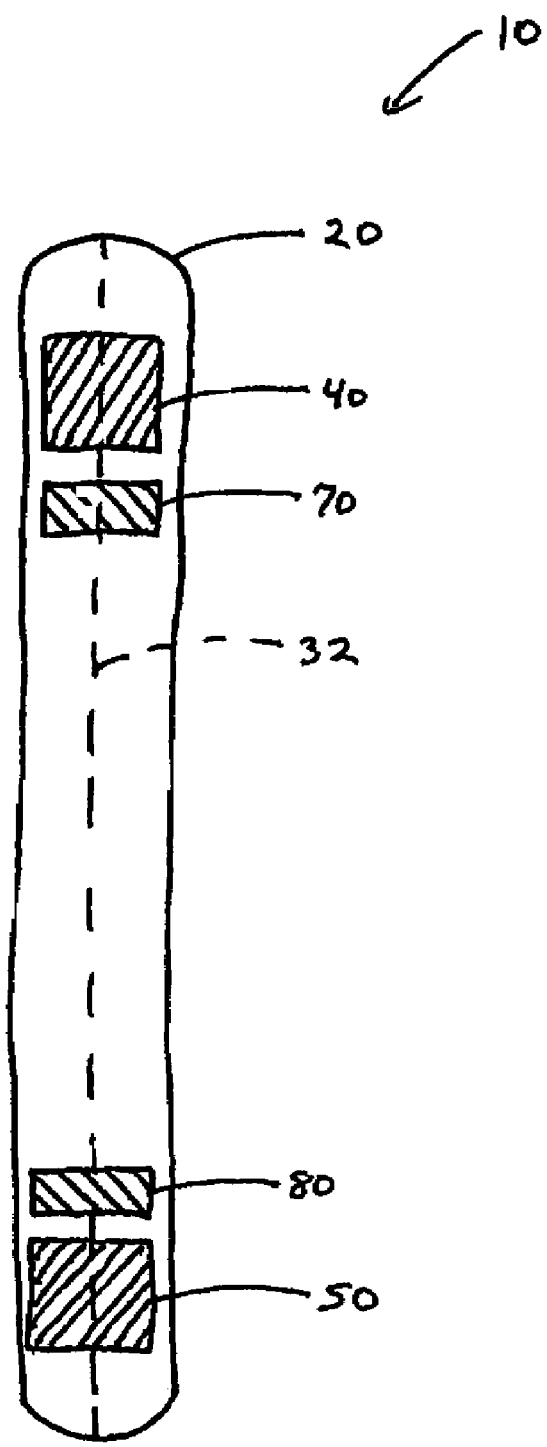
FIG. 3 schematically illustrates a survey tool as part of a logging assembly having a first supplementary sensor and a second supplementary sensor.

In certain embodiments, the downhole portion 30 comprises one or more supplementary sensors in addition to the first acceleration sensor 40 and the second acceleration sensor 50. FIG. 3 schematically illustrates a survey tool 10 comprising a first supplementary sensor 70 and a second supplementary sensor 80. Exemplary supplementary sensors of the downhole portion 30 include, but are not limited to, gamma-ray sensors adapted to detect gamma rays from geological formations in proximity to the downhole portion 30 and magnetic sensors adapted to detect casing collars of the pipe casing sections of the wellbore 20 in proximity to the downhole portion 30. In the embodiment schematically illustrated by FIG. 3, the first supplementary sensor 70 is below and in proximity to the first acceleration sensor 40 and the second supplementary sensor 80 is above and in proximity to the second acceleration sensor 50. Other embodiments can have other configurations of at least one supplementary sensor and the two acceleration sensors. In certain embodiments, such supplementary sensors are used in conjunction with the survey tool 10, as described more fully below, to provide additional data which is used to aid the determination of the depth, the velocity, or both the depth and the velocity of the downhole portion 30 within the wellbore 20.

In certain embodiments, the controller 60 is adapted to determine the depth, the velocity, or both the depth and the velocity of the downhole portion 30 in response to signals received from the various sensors of the downhole portion 30. In certain embodiments, the controller 60 comprises a microprocessor adapted to perform the method described below for determining the depth, the velocity, or both the depth and the velocity of the downhole portion 30 within the wellbore 20. In certain embodiments, the controller 60 further comprises a memory subsystem adapted to store at least a portion of the data obtained from the various sensors. The controller 60 can comprise hardware, software, or a combination of both hardware and software to accomplish the calculation of the depth, the velocity, or both the depth and the velocity. In certain embodiments, the controller 60 comprises a standard personal computer.

In certain embodiments, at least a portion of the controller 60 is located within the downhole portion 30. In certain other embodiments, at least a portion of the controller 60 is located at the surface and is coupled to the downhole portion 30 within the wellbore 20 by a wire or cable 62. In such embodiments, the cable 62 comprises signal conduits through which signals are transmitted from the various sensors within the downhole portion 30 to the controller 60. In certain embodiments in which the controller 60 is adapted to generate control signals for the various components of the survey tool 10 in the downhole portion 30, the cable 62 is adapted to transmit the control signals from the controller 60 to the downhole portion 30.

In certain embodiments, the controller 60 is adapted to perform a post-processing analysis of the data obtained from the various sensors of the survey tool 10. In such post-processing embodiments, data is obtained and saved from the various sensors of the survey tool 10 as the downhole portion 30 travels within the wellbore 20, and the saved data are later analyzed to determine relative depths and/or absolute depths of the various detected features. The saved data obtained from the various sensors, including any aiding data (described more fully below) advantageously includes time reference information (e.g., time tagging) so that the relative times of the detection of various features can be determined. In certain embodiments, the relevant data from the various sensors are manually inspected and correlated with one another to provide aiding data. In other embodiments, the controller 60 performs this correlation of the saved data automatically to provide the aiding data.

In certain other embodiments, the controller 60 provides a real-time processing analysis of the data obtained from the various sensors of the survey tool 10. In such real-time processing embodiments, data obtained from the various sensors of the survey tool 10 are analyzed while the downhole portion 30 travels within the wellbore 20. In certain embodiments, at least a portion of the data obtained from the various sensors is saved in memory for analysis by the controller 60. The controller 60 of certain such embodiments comprises sufficient data processing and data storage capacity to perform the real-time analysis. In certain embodiments, the relevant data from the various sensors are advantageously correlated with one another by the controller 60 to provide aiding data.

Figure 4A:
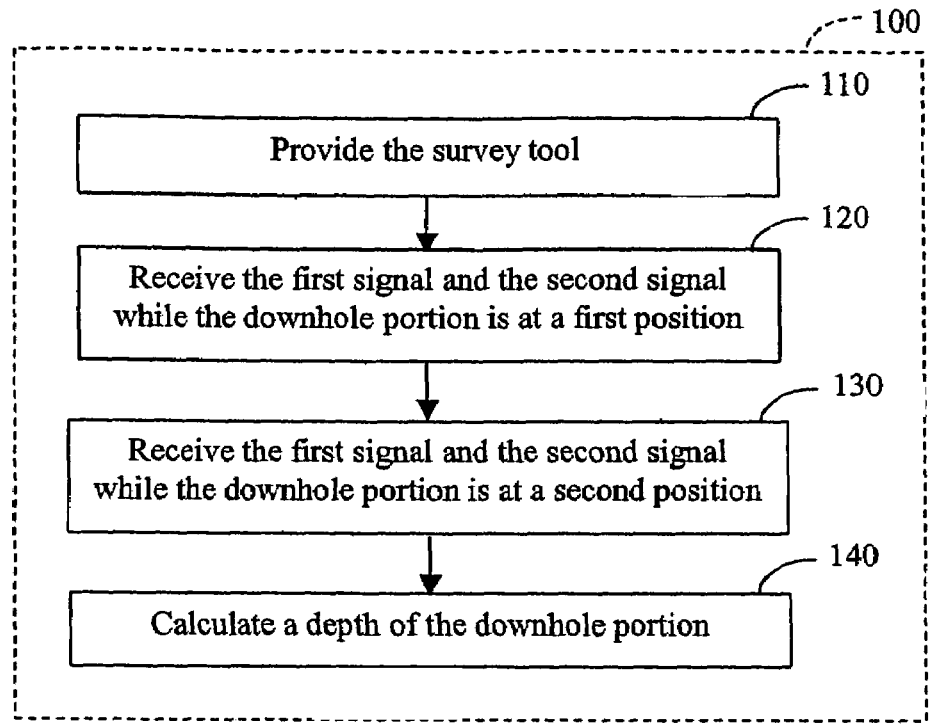
FIG. 4A is a flowchart of an exemplary method of determining a depth of a downhole portion of a survey tool in accordance with embodiments described herein.

FIG. 4A is a flowchart of an exemplary method 100 for determining a depth of a downhole portion 30 of a survey tool 10 along a wellbore 20 in accordance with embodiments described herein. While the method 100 is described herein by reference to the survey tool 10 schematically illustrated by FIGS. 1-3, other survey tools 10 are also compatible with embodiments of the method 100.

In certain embodiments, the method 100 comprises providing the survey tool 10 comprising a downhole portion 30 within the wellbore 20 in an operational block 110. The downhole portion 30 comprises a first acceleration sensor 40 and a second acceleration sensor 50. The first acceleration sensor 40 is adapted to generate a first signal indicative of an acceleration of the first acceleration sensor 40 along the wellbore 20. The second acceleration sensor 50 is adapted to generate a second signal indicative of an acceleration of the second acceleration sensor 50 along the wellbore 20. The second acceleration sensor 50 is spaced from the first acceleration sensor 40 by a non-zero distance.

In certain embodiments, the method 100 further comprises receiving the first signal and the second signal while the downhole portion 30 is at a first location within the wellbore 20 in an operational block 120. The downhole portion 30 of certain embodiments is stationary while at the first location, while in other embodiments, the downhole portion 30 is moving along the wellbore 20 while at the first location.

In certain embodiments, the method 100 further comprises receiving the first signal and the second signal while the downhole portion 30 is at a second location within the wellbore 20 in an operational block 130. The downhole portion 30 of certain embodiments is stationary while at the second location, while in other embodiments, the downhole portion 30 is moving along the wellbore 20 while at the second location.

In certain embodiments, the method 100 further comprises calculating a depth of the downhole portion 30 in an operational block 140. The depth is calculated in response to the first signal and the second signal received while the downhole portion 30 is at the first location and in response to the first signal and the second signal received while the downhole portion 30 is at the second location.

Figure 4B:
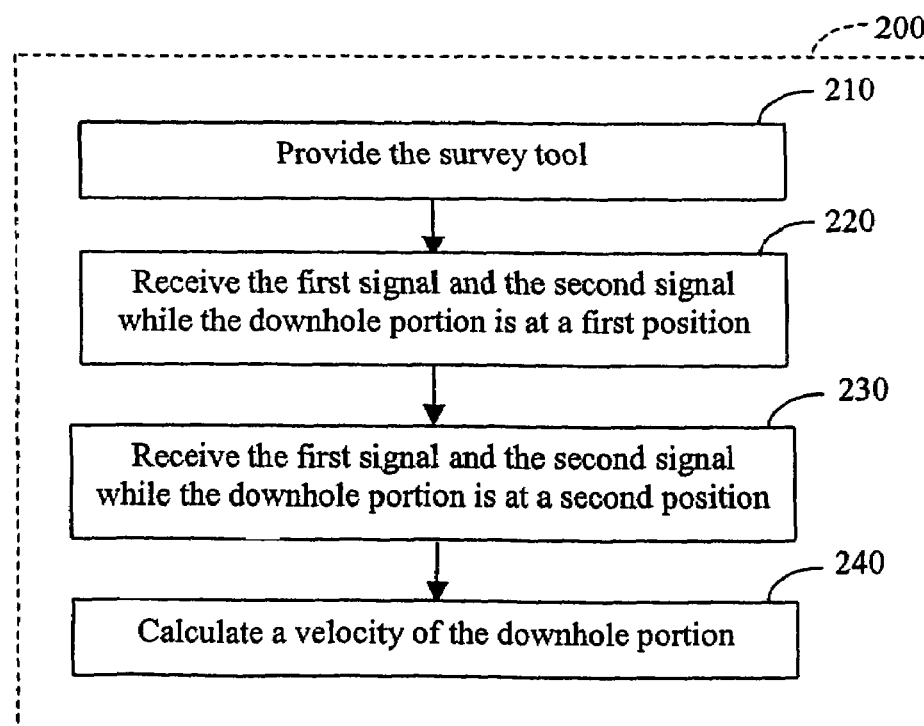
FIG. 4B is a flowchart of an exemplary method of determining a velocity of a downhole portion of a survey tool in accordance with embodiments described herein.

FIG. 4B is a flowchart of an exemplary method 200 for determining a velocity of a downhole portion 30 of a survey tool 10 between two locations along a wellbore 20 in accordance with embodiments described herein. While the method 200 is described herein by reference to the survey tool 10 schematically illustrated by FIGS. 1-3, other survey tools 10 are also compatible with embodiments of the method 200.

In certain embodiments, the method 200 comprises providing the survey tool 10 comprising a downhole portion 30 in an operational block 210. The downhole portion 30 comprises a first acceleration sensor 40 and a second acceleration sensor 50. The first acceleration sensor 40 is adapted to generate a first signal indicative of an acceleration of the first acceleration sensor 40 along the wellbore. The second acceleration sensor 50 is adapted to generate a second signal indicative of an acceleration of the second acceleration sensor 50 along the wellbore. The second acceleration sensor 50 is spaced from the first acceleration sensor 40 by a non-zero distance.

In certain embodiments, the method 200 further comprises receiving the first signal and the second signal while the downhole portion 30 is at a first location within the wellbore 20 in an operational block 220. The downhole portion 30 of certain embodiments is moving along the wellbore 20 while at the first location. In certain embodiments, the method 200 further comprises receiving the first signal and the second signal while the downhole portion 30 is at a second location within the wellbore 20 in an operational block 230. The downhole portion 30 of certain embodiments is moving along the wellbore 20 while at the second location.

In certain embodiments, the method 200 further comprises calculating a velocity of the downhole portion 30 between the first location and the second location in an operational block 240. The velocity is calculated in response to the first signal and the second signal received while the downhole portion 30 is at the first location and in response to the first signal and the second signal received while the downhole portion 30 is at the second location.

An exemplary embodiment for determining the depth, the velocity, or both the depth and the velocity of a downhole portion 30 of a survey tool 10 utilizing a first acceleration sensor 40 and a second acceleration sensor 50 is described below. While the exemplary embodiment described below has a minimum number of variables, other embodiments are not limited to only these variables. Additional variables may also be used, including, but not limited to, misalignments of the acceleration sensors relative to the axis 32. In certain embodiments, the units of the parameters and variables below are in meters-kilogram-second (MKS) units.

Aiding data from other downhole supplementary sensors (e.g., gamma-ray sensors, magnetic sensors for locating casing collars) is advantageously included in certain embodiments to enhance the resultant accuracy of the results. Other embodiments do not utilize aiding data or such supplementary sensors. The exemplary embodiment described below includes the use of aiding data, such as velocity data, absolute-depth data, and relative-depth data. Other types and/or combinations of aiding data are also used in other embodiments.

In the exemplary embodiment described below, the periodicity of the measurements from the two accelerometers define time periods or "epochs" whereby one set of accelerometer measurements are taken at every epoch k. Aiding data are taken in the exemplary embodiments only at a subset of these epochs. In certain embodiments, the different types of aiding data are taken the same epochs, while in other embodiments, the different types of aiding data are taken at different epochs.

In the exemplary embodiment described below, the first acceleration sensor 40 is referred to as the "upper acceleration sensor" and the second acceleration sensor 50 is referred to as the "lower acceleration sensor." The terms "upper" and "lower" are used herein merely to distinguish the two acceleration sensors according to their relative positions along the wellbore 20, and are not to be interpreted as limiting. Other embodiments distinguish the two acceleration sensors from one another using other terms.

Exemplary Embodiment

State Vector With Five Elements

The exemplary embodiment described below utilizes a state vector having five elements and the following parameters:
g=magnitude of gravity;
Δt=time between updates; and
B=distance between the upper acceleration sensor 40 (denoted below by the subscript "U") and the lower acceleration sensor 50 (denoted below by the subscript "L").

In certain embodiments, the time between updates Δt corresponds to the clock frequency of the computer system used to perform the exemplary embodiment.

The state vector $X_k$ at epoch k is expressed as follows:

$$X_k = [\,a_k \quad v_k \quad D_{L,k} \quad d_k \quad I_{L,k}\,]^T; \tag{Eq. 1}$$

where $a_k$ is the calculated acceleration of the survey tool 10 in a direction generally parallel to the wellbore 20, $v_k$ is the calculated velocity of the survey tool 10 in a direction generally parallel to the wellbore 20, $D_{L,k}$ is the calculated depth of the lower acceleration sensor 50, $d_k$ is the calculated apparent dogleg, which is equal to the difference between the inclinations of the lower acceleration sensor 50 and the upper acceleration sensor 40, divided by the distance B (i.e., $d_k = (I_{L,k} - I_{U,k})/B$), and $I_{L,k}$ is the calculated inclination of the lower acceleration sensor 50.

The state co-variance matrix at epoch k is expressed as follows:

$$\Sigma_k = \begin{bmatrix} \sigma^2_{a,k} & \sigma_{av,k} & \sigma_{aD,k} & \sigma_{ad,k} & \sigma_{al,k} \\ \sigma_{va,k} & \sigma^2_{v,k} & \sigma_{vD,k} & \sigma_{vd,k} & \sigma_{vl,k} \\ \sigma_{Da,k} & \sigma_{Dv,k} & \sigma^2_{D,k} & \sigma_{Dd,k} & \sigma_{Dl,k} \\ \sigma_{da,k} & \sigma_{dv,k} & \sigma_{dD,k} & \sigma^2_{d,k} & \sigma_{dl,k} \\ \sigma_{Ia,k} & \sigma_{Iv,k} & \sigma_{ID,k} & \sigma_{Id,k} & \sigma^2_{I,k} \end{bmatrix};$$ (Eq. 2)

where $\sigma^2_{i,k}$ is the variance of parameter number i in state vector $X_k$, and $\sigma_{ij,k}$ is the co-variance between parameter number i and j in state vector $X_k$.

The initial state at epoch k=0, corresponding to the survey tool 10 in a stationary condition within the wellbore 20 is given by the following:

$$X_0 = [0 \quad 0 \quad D_{L,0} \quad (I_{L,0} - I_{U,0})/B \quad I_{L,0}]^T;$$ (Eq. 3)

where $D_{L,0}$ is the initial depth of the lower acceleration sensor 50, $I_{L,0}$ is the initial inclination of the lower acceleration sensor 50, and $I_{U,0}$ is the initial inclination of the upper acceleration sensor 40.

In certain embodiments, the initial depth is referred to a known point in the wellbore 20. The initial inclinations of certain embodiments is determined from stationary acceleration sensor measurements or from known wellbore geometry of a landmark location. Additional acceleration sensors are compatible with the use of acceleration-sensor-based initial inclinations. In certain embodiments, a pair of high-side cross-axial acceleration sensors can be used to provide initial stationary acceleration measurements in a direction substantially perpendicular to the axis 32 and having a component in a vertical plane. In other embodiments, the first acceleration sensor 40 and the second acceleration sensor 50 each comprises a two-axis accelerometer that provides signals indicative of the acceleration parallel to the axis 32 and the acceleration in a direction substantially perpendicular to the axis 32 and having a component in a vertical plane. In certain such embodiments, the initial inclinations are then given by:

$$I_{L,0} = \arctan(-HA_{L,0}/A_{L,0});$$ (Eq. 4)

$$I_{U,0} = \arctan(-HA_{U,0}/A_{U,0});$$ (Eq. 5)

where $A_{L,0}$ is the initial lower acceleration sensor measurement in a direction generally parallel to the axis 32, $A_{U,0}$ is the initial upper acceleration sensor measurement in a direction generally parallel to the axis 32, $HA_{L,0}$ is the initial lower acceleration sensor measurement in a direction substantially perpendicular to the axis 32 and having a component in a vertical plane (i.e., the lower high-side acceleration), and $HA_{U,0}$ is the initial upper acceleration sensor measurement in a direction substantially perpendicular to the axis 32 and having a component in a vertical plane (i.e., the upper high-side acceleration).

The co-variance matrix $\Sigma_0$ for the initial state at epoch k=0 can be expressed as the following:

$$\Sigma_0 = \begin{bmatrix} 0 & 0 & 0 & 0 & 0 \\ 0 & 0 & 0 & 0 & 0 \\ 0 & 0 & \sigma^2_D & 0 & 0 \\ 0 & 0 & 0 & \sigma^2_I/B^2 & \sigma^2_I/(B\sqrt{2}) \\ 0 & 0 & 0 & \sigma^2_I/(B\sqrt{2}) & \sigma^2_I \end{bmatrix};$$ (Eq. 6)

where $\sigma_D$ is the uncertainty in the initial depth of the lower acceleration sensor 50 and $\sigma_I$ is the uncertainty in the initial inclination of the lower acceleration sensor 50. The zero elements of the co-variance matrix $\Sigma_0$ result from the fact that the downhole portion 30 is initially stationary (i.e., acceleration and velocity both equal zero).

The state vector $X_{k-1}$ of epoch k−1 can be used to predict the state vector $X_k$ of a later epoch k using the following equations:

$$a_k = a_{k-1};$$ (Eq. 7)

$$v_k = v_{k-1} + a_{k-1}*\Delta t;$$ (Eq. 8)

$$D_k = D_{k-1} + v_{k-1}*\Delta t + (a_{k-1}*\Delta t^2)/2;$$ (Eq. 9)

$$d_k = d_{k-1};$$ (Eq. 10)

$$I_k = I_{k-1} + d_{k-1}*v_{k-1}*\Delta t;$$ (Eq. 11)

where $\Delta t$ is the time period between epoch k−1 and epoch k. In addition, other embodiments utilize other equations which include higher-order terms to predict the state vector of epoch k based on an earlier state vector of epoch k−1.

The co-variance matrix $\chi$ for the predicted state vector is given by the following diagonal matrix:

$$\chi = \begin{bmatrix} (p_a/\alpha)^2 & 0 & 0 & 0 & 0 \\ 0 & (p_v/\alpha)^2 & 0 & 0 & 0 \\ 0 & 0 & (p_D/\alpha)^2 & 0 & 0 \\ 0 & 0 & 0 & (p_d/\alpha)^2 & 0 \\ 0 & 0 & 0 & 0 & (p_I/\alpha)^2 \end{bmatrix};$$ (Eq. 12)

where $p_a$ is the maximum change of acceleration over time period $\Delta t$, $p_v$ is the maximum change of velocity over time period $\Delta t$, $p_D$ is the maximum change of depth over time period $\Delta t$, $p_d$ is the maximum change of apparent dogleg over time period $\Delta t$, and $p_I$ is the maximum change of inclination over time period $\Delta t$. In certain embodiments, $p_a$ is assumed to be given by $p_a = 2p_D/(\Delta t)^2$. In certain embodiments, $p_v$ is assumed to be given by $p_v = p_D/\Delta t$. In certain embodiments, $p_d$ is assumed to be given by $p_d = 2p_I/B$.

The parameter $\alpha$ provides a multiplication factor between the standard deviation $\sigma$ of a state vector element and the maximum change p of the state vector element, such that the maximum change of the state vector element can be expressed as $p = \alpha*\sigma$. In certain embodiments, the multiplication factor $\alpha$ is in a range between approximately 2 and approximately 5, and in other embodiments, the multiplication factor $\alpha$ is substantially equal to 3.

The acceleration sensors provide the following measurements at epoch k:

$$A_k = [A_{L,k} \; A_{U,k}]^T; \quad \text{(Eq. 13)}$$

where $A_{L,k}$ is the measurement from the lower acceleration sensor 50 and $A_{U,k}$ is the measurement from the upper acceleration sensor 40 at epoch k. The co-variance matrix corresponding to the acceleration sensor measurements at epoch k is provided by the following diagonal matrix:

$$\Psi_{A,k} = \begin{bmatrix} \sigma^2_{A_L,k} & 0 \\ 0 & \sigma^2_{A_U,k} \end{bmatrix}; \quad \text{(Eq. 14)}$$

where $\sigma_{A_L,k}$ is the uncertainty of the lower acceleration sensor measurements and $\sigma_{A_U,k}$ is the uncertainty of the upper acceleration sensor measurements. In certain embodiments, $\sigma_{A_L,k}$ is the same for all epochs, and $\sigma_{A_U,k}$ is the same for all epochs. In certain embodiments in which the two acceleration sensors are substantially identical, $\sigma_{A_L,k} = \sigma_{A_U,k}$.

As discussed more fully below, in certain embodiments, additional aiding data may be supplied. In certain embodiments, aiding velocity measurements [$V_k$] are provided with a corresponding co-variance matrix $$\Psi_{V,k} = [\sigma^2_{V,k}],$$

where $\sigma_{V,k}$ is the uncertainty of the aiding velocity measurements. In certain embodiments, aiding absolute-depth measurements [$S_k$] are provided with a corresponding co-variance matrix $$\Psi_{S,k} = [\sigma^2_{S,k}],$$

where $\sigma_{S,k}$ is the uncertainty of the aiding absolute-depth measurements. In certain embodiments, aiding relative-depth measurements [$R_k$] are provided with a corresponding co-variance matrix $$\Psi_{R,k} = [\sigma^2_{R,k}],$$

where $\sigma_{R,k}$ is the uncertainty of the aiding relative-depth measurements. Other aiding measurements can be used in accordance with embodiments described herein.

The theoretical acceleration sensor measurements can be calculated using the predicted state vector elements $a_k$ and $I_k$ in the following equations:

$$A'_{L,k} = a_k + g^* \cos(I_k); \quad \text{(Eq. 15)}$$

$$A'_{U,k} = a_k + g^* \cos(I_k - d_k{}^*B); \quad \text{(Eq. 16)}$$

where $A'_{L,k}$ is the theoretical lower acceleration sensor measurement, $A'_{U,k}$ is the theoretical upper acceleration sensor measurement.

The equations which provide the predicted state vector at epoch k based on the state vector at epoch k−1 can be expressed as the following prediction matrix $\Phi_k$:

$$\Phi_k = \begin{bmatrix} 1 & 0 & 0 & 0 & 0 \\ \Delta t & 1 & 0 & 0 & 0 \\ (\Delta t)^2/2 & \Delta t & 1 & 0 & 0 \\ 0 & 0 & 0 & 1 & 0 \\ 0 & 0 & 0 & v_{k-1}*\Delta t & 1 \end{bmatrix}. \quad \text{(Eq. 17)}$$

In this way, the predicted state vector at epoch k can be expressed as $X_k = \Phi_k{}^*X_{k-1}$.

The prediction matrix $\Phi_k$ can not be used for a prediction of the state co-variance matrix because it is non-linear (i.e., one of the state elements is included in the matrix). Instead, a linear prediction matrix $\Gamma_k$ can be used to update the state co-variance matrix, corresponding to the uncertainty of the new state vector, as follows:

$$\Sigma_k = \Gamma_k * \Sigma_{k-1} * \Gamma_k^T + \chi; \quad \text{(Eq. 18)}$$

where $\Gamma_k$ is given by the following:

$$\Gamma_k = \begin{bmatrix} 1 & 0 & 0 & 0 & 0 \\ \Delta t & 1 & 0 & 0 & 0 \\ (\Delta t)^2/2 & \Delta t & 1 & 0 & 0 \\ 0 & 0 & 0 & 1 & 0 \\ 0 & d_{k-1}*\Delta t & 0 & v_{k-1}*\Delta t & 1 \end{bmatrix}. \quad \text{(Eq. 19)}$$

Three matrices can be defined to be used to calculate updates of the state vector $X_k$ and the state co-variance matrix $\Sigma_k$ based on measurements. The design matrix $\alpha_{A,k}$ corresponds to the partial derivatives of the theoretical measurements and is given by the following:

$$\alpha_{A,k} = \begin{bmatrix} 1 & 0 & 0 & 0 & -g*\sin(I_{k-}) \\ 1 & 0 & 0 & \sin(I_{k-} - d_{k-}*B)*B & -\sin(I_{k-} - d_{k-}*B) \end{bmatrix}. \quad \text{(Eq. 20)}$$

The constant vector $\beta_{A,k}$ corresponds to the measurements minus the theoretical measurements and is given by the following:

$$\beta_{A,k} = \begin{bmatrix} A_{L,k} - A'_{L,k-} \\ A_{U,k} - A'_{U,k-} \end{bmatrix} = \begin{bmatrix} A_{L,k} - a_{k-} - g*\cos(I_{k-}) \\ A_{U,k} - a_{k-} - g*\cos(I_{k-} - d_{k-}*B) \end{bmatrix}. \quad \text{(Eq. 21)}$$

The gain matrix $G_k$ is given by the following:

$$G_k = \Sigma_{k-} * \alpha_{A,k}^T * (\Psi_{A,k} + \alpha_{A,k} * \Sigma_{k-} * \alpha_{A,k}^T)^{-1}. \quad \text{(Eq. 22)}$$

The after-measurement update of the state vector $X_k$ and the after-measurement update of the state co-variance matrix $\Sigma_k$ are calculated as follows:

$$X_k = X_{k-} - G_k * (\alpha_{A,k} * X_{k-} + \beta_{A,k}); \qquad \text{(Eq. 23)}$$

$$\Sigma_k = \Sigma_{k-} - G_k * \alpha_{A,k} * \Sigma_{k-}. \qquad \text{(Eq. 24)}$$

where k– denotes the values of epoch k prior to the current update. Using such a labeling scheme, k– in Equations 20 through 24 denotes the values of the predicted state vector prior to the update using the acceleration measurements. Thus, $X_{k-}$ and $\Sigma_{k-}$ are the state vector and state co-variance matrix, respectively, of epoch k after the prediction but prior to the measurement update.

Aiding Data

Stationary Data

In certain embodiments, the downhole portion 30 of the survey tool 10 is stopped within the wellbore 20 one or more times to obtain aiding data while the downhole portion 30 is stationary. In certain embodiments, the downhole portion 30 is stopped at one or more random or arbitrary times, while in other embodiments, the downhole portion 30 is stopped at multiple times with a predetermined period. In certain such embodiments which only have the first acceleration sensor 40 and the second acceleration sensor 50, the state vector $X_k$ and the co-variance matrix $\Sigma_k$ can be expressed as:

$$X_k = [\,0 \quad 0 \quad D_{L,k-} \quad d_{k-} \quad I_{L,k-}\,]^T; \qquad \text{(Eq. 25)}$$

$$\Sigma_k = \begin{bmatrix} 0 & 0 & 0 & 0 & 0 \\ 0 & 0 & 0 & 0 & 0 \\ 0 & 0 & \Sigma_{33,k-} & \Sigma_{34,k-} & \Sigma_{35,k-} \\ 0 & 0 & \Sigma_{43,k-} & \Sigma_{44,k-} & \Sigma_{45,k-} \\ 0 & 0 & \Sigma_{53,k-} & \Sigma_{54,k-} & \Sigma_{55,k-} \end{bmatrix}; \qquad \text{(Eq. 26)}$$

which in certain embodiments is given by:

$$\Sigma_k = \begin{bmatrix} 0 & 0 & 0 & 0 & 0 \\ 0 & 0 & 0 & 0 & 0 \\ 0 & 0 & \sigma_{D,k-}^2 & \sigma_{Dd,k-} & \sigma_{DI,k-} \\ 0 & 0 & \sigma_{dD,k-} & \sigma_{d,k-}^2 & \sigma_{dI,k-} \\ 0 & 0 & \sigma_{ID,k-} & \sigma_{Id,k-} & \sigma_{I,k-}^2 \end{bmatrix}; \qquad \text{(Eq. 27)}$$

where k– in Equations 25 through 27 denotes the values of the various elements prior to the update using the aiding stationary data. In other such embodiments which have cross-axial acceleration sensors, the state vector $X_k$ and the co-variance matrix $\Sigma_k$ can be expressed using the following:

$$d_k = (\arctan(-HA_{L,k}/A_{L,k}) - \arctan(-HA_{U,k}/A_{U,k}))/B; \qquad \text{(Eq. 28)}$$

$$I_k = \arctan(-HA_{L,k}/A_{L,k}); \qquad \text{(Eq. 29)}$$

$$\Sigma_k = \begin{bmatrix} 0 & 0 & 0 & 0 & 0 \\ 0 & 0 & 0 & 0 & 0 \\ 0 & 0 & \Sigma_{33,k-} & 0 & 0 \\ 0 & 0 & 0 & \sigma_I^2/B^2 & \sigma_I^2/(B\sqrt{2}) \\ 0 & 0 & 0 & \sigma_I^2/(B\sqrt{2}) & \sigma_I^2 \end{bmatrix}; \qquad \text{(Eq. 30)}$$

which in certain embodiments is given by:

$$\Sigma_k = \begin{bmatrix} 0 & 0 & 0 & 0 & 0 \\ 0 & 0 & 0 & 0 & 0 \\ 0 & 0 & \sigma_D^2 & 0 & 0 \\ 0 & 0 & 0 & \sigma_I^2/B^2 & \sigma_I^2/(B\sqrt{2}) \\ 0 & 0 & 0 & \sigma_I^2/(B\sqrt{2}) & \sigma_I^2 \end{bmatrix}. \qquad \text{(Eq. 31)}$$

Velocity Data

In certain embodiments, aiding velocity data is provided by one or more supplementary sensors which are part of the downhole portion 30 of the survey tool 10. As described above in relation to FIG. 3, exemplary supplementary sensors include, but are not limited to, gamma-ray sensors adapted to detect gamma rays from geological formations in proximity to the downhole portion 30 and magnetic sensors adapted to detect casing collars in proximity to the downhole portion 30. Such supplementary sensors do not continuously measure the velocity of the survey tool 10, but they detect landmark features which can be used to calculate the average velocity of the downhole portion 30 as the downhole portion 30 passes the landmark feature or between the locations of two or more selected landmark features.

Figure 5A:
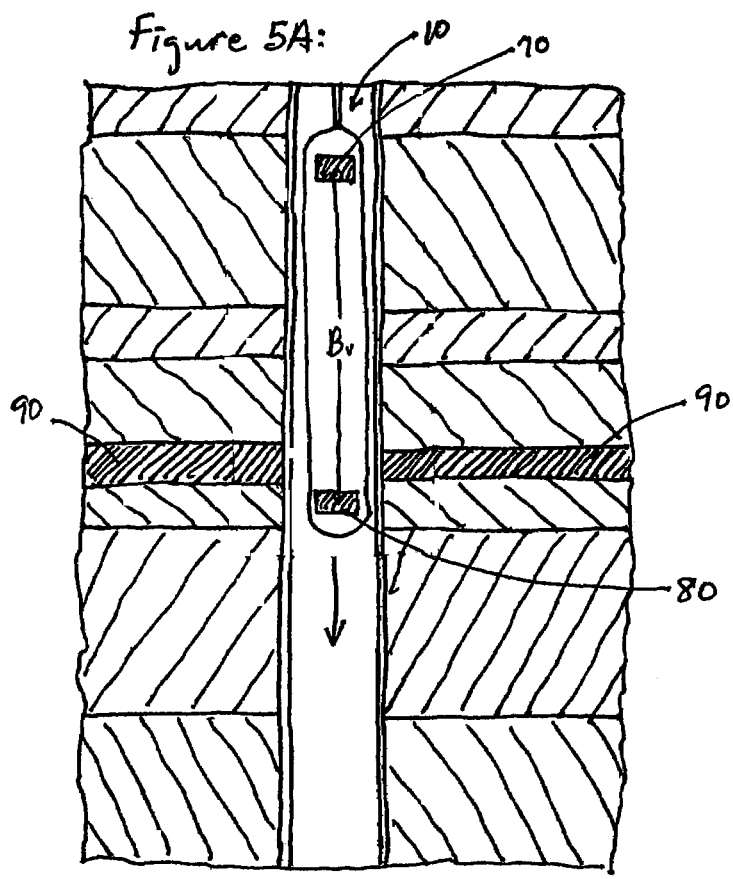
FIG. 5A schematically illustrates a survey tool having a first supplementary sensor and a second supplementary sensor passing a landmark feature.
Figure 5B:
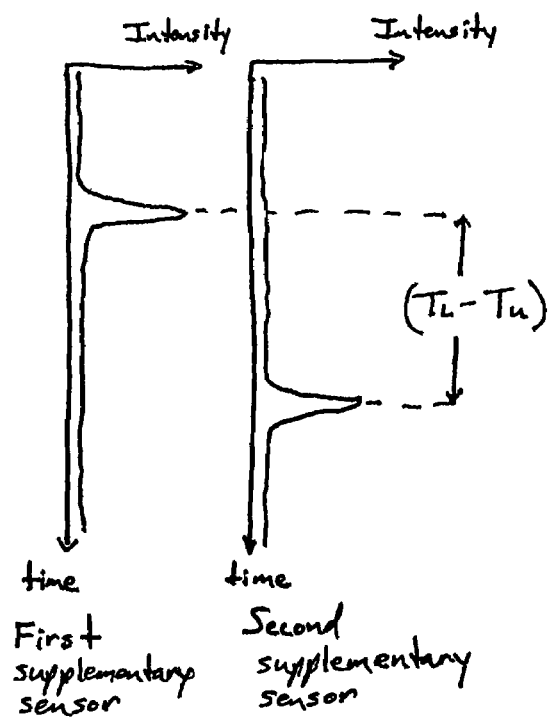
FIG. 5B is a plot of the signals from the first supplementary sensor and the second supplementary sensor as a function of time.

FIG. 5 schematically illustrates the signals from a first gamma-ray sensor 70 and a second gamma-ray sensor 80 as the downhole portion 30 moves past a geological formation 90 having a gamma-ray emission higher than the surrounding formations. The first gamma-ray sensor 80 is lower than the second gamma-ray sensor 70, so the first gamma-ray sensor 80 detects the formation 90 before the second gamma-ray sensor 70 detects the same formation 90. By correlating the measurements of the two supplementary sensors, and knowing the distance $B_v$ between the two supplementary sensors, the average velocity of the downhole portion 30 as it passed the geological formation 90 can be calculated as follows:

$$V_k = B_v/(T_L - T_U); \qquad \text{(Eq. 32)}$$

where $B_v$ is the distance between the first gamma-ray sensor 80 and the second gamma-ray sensor 70, $T_L$ is the time that the first gamma-ray sensor 80 detects the geological formation 90, and $T_U$ is the time that the second gamma-ray sensor 70 detects the geological formation 90. Similarly, two magnetic sensors of the downhole portion 30 can be used to determine an average velocity of the downhole portion 30 relative to a casing collar of the wellbore 20.

The measured velocity $V_k$ is the average velocity over the time interval ranging from $T_L$ to $T_U$. However, the average velocity approaches the instantaneous velocity as the time interval ($T_L$-$T_U$) approaches zero. In certain embodiments, the average velocity is used to analyze the state vector $X_k$. In certain other embodiments, the analysis of the state vector $X_k$ utilizes the instantaneous velocity at epoch k. In certain such embodiments, the distance $B_v$ is selected to be as small as possible without letting the noise or uncertainty in the two time measurements corrupt the measured velocity.

The uncertainty $\sigma_{V,k}$ in the measured velocity at epoch k depends on the instability of the velocity over the time interval between $T_L$ and $T_U$, and on the uncertainty in the repeated detection of the landmark feature being referenced. An estimate of the uncertainty of the measured velocity is given by:

$$\sigma_{V,k}^2 = (p_v * \alpha * (T_U - T_L)/\Delta t)^2 + 2\sigma_{det,k}^2/(T_U - T_L)^2; \quad \text{(Eq. 33)}$$

where $\sigma_{det,k}$ is the uncertainty in the detection of the actual location of the formation at epoch k, and $p_v$ is the maximum change of the velocity of the time period $\Delta t$ of the epoch k. In certain embodiments, $\sigma_{det,k}$ is constant among different epochs. In certain embodiments, the maximum change of the velocity over the time period $\Delta t$ is assumed to be equal to the maximum change of the depth $p_D$ divided by the time period $\Delta t$, where $\Delta t$ is small.

In certain embodiment in which such aiding velocity data is available, a design velocity vector $\alpha_{V,k}$ (corresponding to the partial derivatives of the theoretical velocity measurements which are equal to the current state velocity) and a constant velocity vector $\beta_{V,k}$ (corresponding to the measurements minus the theoretical measurements) can be expressed as:

$$\alpha_{V,k} = [0 \ 1 \ 0 \ 0 \ 0]; \quad \text{(Eq. 34)}$$

$$\beta_{V,k} = [V_k - v_{k-}]. \quad \text{(Eq. 35)}$$

Using these two vectors, a gain velocity matrix $G_k$ can be expressed as:

$$G_k = \Sigma_{k-} * \alpha_{V,k}^T * (\Psi_{V,k} + \alpha_{V,k} * \Sigma_{k-} * \alpha_{V,k}^T)^{-1}; \quad \text{(Eq. 36)}$$

which can be used to express the state vector $X_k$ and the co-variance matrix $\Sigma_k$ as:

$$X_k = X_{k-} - G_k * (\alpha_{V,k} * X_{k-} + \beta_{V,k}); \quad \text{(Eq. 37)}$$

$$\Sigma_k = \Sigma_{k-} - G_k * \alpha_{V,k} * \Sigma_{k-}; \quad \text{(Eq. 38)}$$

where k− in Equations 35 through 38 denotes the values of the various elements prior to the update using the aiding velocity data.

Absolute Depth

In certain embodiments in which the absolute depth of a landmark feature is known, the detection of this landmark feature by one or more sensors of the downhole portion 30 can be used to provide aiding data. In such embodiments, the time at which the landmark feature is passed by the downhole portion 30 is noted, and for the corresponding epoch k, the depth $S_k$ can be expressed as:

$$S_k = S_k^S + B^S; \quad \text{(Eq. 39)}$$

where $S_k^S$ is the depth of the landmark feature and $B^S$ is the distance between the lower acceleration sensor 50 and the supplementary sensor in proximity to the lower acceleration sensor 50 (e.g., the second gamma-ray sensor 80 as in FIG. 3).

In certain embodiments, one or more of the same supplementary sensors are used to provide both aiding velocity data and aiding absolute-depth data. In certain embodiments, two supplementary sensors are used to provide two separate absolute-depth measurements of the same landmark feature. In such embodiments, the two measured absolute depths, $S_k$ and $S_{k'}$, are related to two different epochs which are temporally close, and are related by the following:

$$S_k = S_k^S + B^{SL}; \quad \text{(Eq. 40)}$$

$$S_{k'} = S_{k'}^S + B^{SU}; \quad \text{(Eq. 41)}$$

where $B^{SL}$ is the distance between the lower acceleration sensor 50 and the second supplementary sensor (e.g., the second gamma-ray sensor 80 as in FIG. 3), and $B^{SU}$ is the distance between the lower acceleration sensor 50 and the first supplementary sensor (e.g., the first gamma-ray sensor 70 as in FIG. 3).

The uncertainty $\sigma_{S,k}$ of the absolute-depth measurements at epochs k and k' depends on both the uncertainty in the given value of the absolute depth of the landmark feature and the uncertainty in the detection of the landmark feature by the supplementary sensor. The uncertainty of the absolute-depth measurement can be expressed as follows:

$$\sigma_{S,k}^2 = \sigma_{det,k}^2 + \sigma_{given,k}^2; \quad \text{(Eq. 42)}$$

where $\sigma_{det,k}$ is the uncertainty in the detection of the landmark feature and $\sigma_{given,k}$ is the uncertainty in the given value of the absolute depth of the landmark feature. In certain embodiments, $\sigma_{det,k}$ is constant for different epochs.

In certain embodiments in which aiding absolute-depth data is available, a design absolute-depth vector $\alpha_{S,k}$, a constant absolute-depth vector $\beta_{S,k}$, and a gain absolute-depth matrix $G_k$ can be used to express the state vector $X_k$ and the co-variance matrix $\Sigma_k$ as follows:

$$\alpha_{S,k} = [0 \ 0 \ 1 \ 0 \ 0]; \quad \text{(Eq. 43)}$$

$$\beta_{S,k} = [S_k - D_{k-}]. \quad \text{(Eq. 44)}$$

$$G_k = \Sigma_{k-} * \alpha_{S,k}^T * (\Psi_{S,k} + \alpha_{S,k} * \Sigma_{k-} * \alpha_{S,k}^T)^{-1}; \quad \text{(Eq. 45)}$$

$$X_k = X_{k-} - G_k * (\alpha_{S,k} * X_{k-} + \beta_{S,k}); \quad \text{(Eq. 46)}$$

$$\Sigma_k = \Sigma_{k-} - G_k * \alpha_{S,k} * \Sigma_{k-}; \quad \text{(Eq. 47)}$$

where k− in Equations 44 through 47 denotes the values of the various elements prior to the update using the aiding absolute-depth data.

Relative Depth

In certain embodiments, the downhole portion 30 provides relative-depth data which does not depend on the known depths of landmark features. In certain embodiments, such relative-depth data is provided by two supplementary sensors adapted to provide large and sharp signal spikes at landmark locations. In certain embodiments, these landmark locations are previously known, while in other embodiments, these landmark locations are previously unknown. In certain embodiments, the relative-depth data is provided by a similar configuration of two supplementary sensors of the downhole portion 30 as that which provides the aiding velocity data described above. However, while the velocity data is advantageously provided by two supplementary sensors which are relatively close together, the relative-depth data is advantageously provided by two supplementary sensors which are farther apart from one another.

In certain embodiments, the epoch k is defined to be the epoch during which the second supplementary sensor (e.g., the second gamma-ray sensor 80 of FIG. 3) passes a detectable landmark location and the epoch k' is defined to be the epoch during which the first supplementary sensor (e.g., the first gamma-ray sensor 70 of FIG. 3) passes the same detectable landmark location. The aiding relative-depth measurement $R_k$ at epoch k of certain embodiments can be expressed as:

$$R_k = D_{k'} + B^r + B^a; \quad \text{(Eq. 48)}$$

where $D_{k'}$ is the calculated depth of the downhole portion 30 at epoch k', $B^r$ is the distance between the first supplementary sensor and the second supplementary sensor (e.g., the two gamma-ray sensors 70, 80 of FIG. 3), and $B^a$ is the distance between the second acceleration sensor 50 and the second supplementary sensor (e.g., the second gamma-ray sensor 80 of FIG. 3).

In certain embodiments, the uncertainty in the relative-depth measurement at epoch k depends on both the uncertainty of the calculated depth at epoch k' and the uncertainty in the relative depth detection. The uncertainty in the relative-depth measurement can be expressed as follows:

$$\sigma_{R,k}^2 = \sigma_{rel}^2 + \sigma_{last,k}^2; \quad \text{(Eq. 49)}$$

where $\sigma_{rel}$ is the uncertainty in the relative-depth detection for the landmark location and $\sigma_{last,k}$ is the uncertainty of the calculated depth at epoch k. In certain embodiments, $\sigma_{last,k}$ is given by the third diagonal element ($\Sigma_{33,k'}$) of the solution co-variance matrix at epoch k'. In certain embodiments, $\sigma_{last,k}$ is equal to $\sigma_D$, which is the uncertainty in the depth measurement.

In certain embodiments in which aiding relative depth data is available, a design relative-depth vector $\alpha_{S,k}$, a constant relative-depth vector $\beta_{S,k}$, and a gain relative-depth matrix $G_k$ can be used to express the state vector $X_k$ and the co-variance matrix $\Sigma_k$ as follows:

$$\alpha_{R,k} = [0 \ 0 \ 1 \ 0 \ 0]; \quad \text{(Eq. 50)}$$

$$\beta_{R,k} = [R_k - D_{k-}]. \quad \text{(Eq. 51)}$$

$$G_k = \Sigma_{k-} * \alpha_{R,k}^T * (\Psi_{R,k} + \alpha_{R,k} * \Sigma_{k-} * \alpha_{R,k}^T)^{-1}; \quad \text{(Eq. 52)}$$

$$X_k = X_{k-} - G_k * (\alpha_{R,k} * X_{k-} + \beta_{R,k}); \quad \text{(Eq. 53)}$$

$$\Sigma_k = \Sigma_{k-} - G_k * \alpha_{R,k} * \Sigma_{k-}; \quad \text{(Eq. 54)}$$

where k− in Equations 51 through 54 denotes the values of the various elements prior to the update using the aiding relative-depth data.

Various embodiments of the present invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. A survey tool for use in a wellbore, the survey tool comprising:
   a downhole portion moving within the wellbore in a direction generally parallel to the wellbore;
   a first acceleration sensor mounted at a first position within the downhole portion, the first acceleration sensor generating a first signal indicative of a first acceleration in a first direction generally parallel to the wellbore at the first position;
   a second acceleration sensor mounted at a second position within the downhole portion, the second acceleration sensor generating a second signal indicative of a second acceleration in a second direction generally parallel to the wellbore at the second position; and
   a controller calculating a depth, a velocity, or both a depth and a velocity of the downhole portion in response to the first signal and the second signal.

2. The survey tool of claim 1, wherein the first direction can vary by a non-zero angle relative to the second direction.

3. The survey tool of claim 2, wherein the first signal and the second signal are generated simultaneously.

4. The survey tool of claim 1, wherein the downhole portion comprises a housing.

5. The survey tool of claim 4, wherein the first acceleration sensor and the second acceleration sensor are positioned within the housing.

6. The survey tool of claim 1, wherein the first position is separated from the second position by a distance larger than approximately 10 meters.

7. The survey tool of claim 1, wherein the first position is separated from the second position by a distance in a range between approximately 10 meters and approximately 30 meters.

8. The survey tool of claim 1, wherein the first acceleration sensor and the second acceleration sensor are substantially identical.

9. The survey tool of claim 1, wherein the downhole portion further comprises at least one supplementary sensor, the supplementary sensor detecting a landmark location within the wellbore.

10. The survey tool of claim 9, wherein at least one supplementary sensor comprises a gamma-ray sensor which detects gamma rays from geological formations in proximity to the downhole portion.

11. The survey tool of claim 9, wherein the wellbore comprises pipe casing sections joined by casing collars, and wherein at least one supplementary sensor comprises a magnetic sensor which detects casing collars in proximity to the downhole portion.

12. The survey tool of claim 1, wherein the controller provides real-time processing analysis of the first signal and the second signal.

13. The survey tool of claim 1, wherein the controller provides post-processing analysis of the first signal and the second signal.

14. A drilling assembly comprising the survey tool of claim 1.

15. A logging assembly comprising the survey tool of claim 1.

16. A method for determining a depth or a velocity, or both a depth and a velocity, of a downhole portion of a survey tool moving within a wellbore, the method comprising:
   providing the survey tool of claim 1;
   receiving the first signal and the second signal while the downhole portion is at a first location within the wellbore;

receiving the first signal and the second signal while the downhole portion is at a second location within the wellbore; and calculating a depth, or a velocity, or both a depth and a velocity, of the downhole portion of the survey tool in response to the first signal and the second signal received while the downhole portion is at the first location and in response to the first signal and the second signal received while the downhole portion is at the second location.

17. The method of claim 16, wherein the downhole portion is stationary while at the first location.

18. The method of claim 16, wherein the downhole portion is moving while at the first location.

19. The method of claim 16, wherein the downhole portion is stationary while at the second location.

20. The method of claim 16, wherein the downhole portion is moving while at the second location.

* * * * *